(12) United States Patent
Huang et al.

(10) Patent No.: US 11,063,628 B2
(45) Date of Patent: Jul. 13, 2021

(54) COMMUNICATION DEVICE CAPABLE OF ECHO CANCELLATION

(71) Applicant: REALTEK SEMICONDUCTOR CORPORATION, Hsinchu (TW)

(72) Inventors: Liang-Wei Huang, Hsinchu (TW); Yu-Xuan Huang, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/889,051

(22) Filed: Jun. 1, 2020

(65) Prior Publication Data

US 2021/0028819 A1 Jan. 28, 2021

(30) Foreign Application Priority Data

Jul. 24, 2019 (TW) ................................ 108126109

(51) Int. Cl.
*H04L 5/16* (2006.01)
*H04B 3/20* (2006.01)

(52) U.S. Cl.
CPC ..................................... *H04B 3/20* (2013.01)

(58) Field of Classification Search
CPC ........ H04B 1/40; H04B 3/23; H04B 10/2507; H04B 3/30; H04L 27/2601; H04L 7/033
USPC ................................................ 375/219, 308
See application file for complete search history.

(56) References Cited

U.S. PATENT DOCUMENTS

| 2005/0219100 | A1* | 10/2005 | Kobayashi | H03M 1/167 341/155 |
| 2007/0268407 | A1 | 11/2007 | Rea et al. | |
| 2013/0184036 | A1* | 7/2013 | Piket | H04M 9/082 455/570 |
| 2018/0248583 | A1* | 8/2018 | Sekiya | H04B 7/18584 |
| 2020/0349254 | A1* | 11/2020 | Walthinsen | G06F 21/554 |

OTHER PUBLICATIONS

OA letter of the counterpart TW application (appl. no. 108126109) dated Jul. 8, 2020. Summary of the OA letter: claims 1, 4-5, 7, 10 are rejected as being unpatentable over the cited reference 1 (US 2007/0268407A1) in view of the common knowledge of this technical field.

* cited by examiner

*Primary Examiner* — Khai Tran
(74) *Attorney, Agent, or Firm* — WPAT, PC

(57) ABSTRACT

A communication device capable of echo cancellation includes a digital circuit, a transmitter circuit, a hybrid circuit, an adjustable capacitor circuit, and a receiver circuit. The digital circuit transmits a digital transmission signal and receives a digital reception signal. The transmitter circuit outputs an analog transmission differential signal according to the digital transmission signal. The hybrid circuit outputs a transmission signal to an external circuit via an adjustable capacitor circuit according to the analog transmission differential signal, and outputs an analog reception differential signal to a receiver circuit according to at least one of the analog transmission differential signal and a reception signal from the external circuit. The adjustable capacitor circuit controls a delay difference between positive-end and negative-end signals of the transmission signal according to an echo cancellation control signal. The receiver circuit outputs the digital reception signal to the digital circuit according to the analog reception differential signal.

19 Claims, 6 Drawing Sheets

COMMUNICATION DEVICE CAPABLE OF ECHO CANCELLATION

BACKGROUND OF THE INVENTION

1. Field of the Invention

The present disclosure relates to a communication device, especially to a communication device capable of echo cancellation.

2. Description of Related Art

In the communication field, the full-duplex technique allows a communicating device to perform transmission and reception through the same communication channel simultaneously. However, due to some influence such as an impedance mismatch, a part of the transmitted signal will be reflected as the echo included in the received signal. In light of the above problem, the applicant discloses the following echo cancellation techniques:
(1) U.S. Pat. No. 8,670,555B2;
(2) U.S. Pat. No. 7,304,961 B2;
(3) U.S. patent application publication US 2005/0169163 A1;
(4) Taiwan (R.O.C.) patent 1237457; and
(5) Taiwan (R.O.C.) patent 1233269.

However, regarding a conventional communication device performing communication with a differential signal, the conventional communication device doesn't thoroughly consider the difference between the transmission paths of the positive-end signal and negative-end signal of a differential signal that is transmitted via a communication channel. The difference between the transmission paths will cause the phase difference between the positive-end signal and negative-end signal and lead to intra-pair skew which turns a part of the differential signal into electromagnetic interference noise. Such problem is particularly serious in a circumstance that the routing layout of a circuit board is difficult.

SUMMARY OF THE INVENTION

An object of the present disclosure is to provide a communication device capable of echo cancellation and to prevent the problem of the prior art.

An embodiment of the communication device of the present disclosure includes a digital circuit, a transmitter circuit, a hybrid circuit, an adjustable capacitor circuit, and a receiver circuit. The digital circuit is configured to transmit a digital transmission signal and receive a digital reception signal. The transmitter circuit is configured to output an analog transmission differential signal according to the digital transmission signal. The hybrid circuit is coupled to the transmitter circuit and receiver circuit, and configured to output a transmission signal to an external circuit via the adjustable capacitor circuit according to the analog transmission differential signal and output an analog reception differential signal to the receiver circuit according to at least one of the analog transmission differential signal and a reception signal. The adjustable capacitor circuit is configured to control a delay difference between a positive-end signal and a negative-end signal of the transmission signal according to a first echo cancellation control signal. The receiver circuit is configured to output the digital reception signal to the digital circuit according to the analog reception differential signal.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure discloses a communication device capable of echo cancellation and eliminating/reducing intra-pair skew. The communication device of the present disclosure can be a wired network device, e.g., Ethernet network device, but the present invention is not limited thereto.

Figure 1:
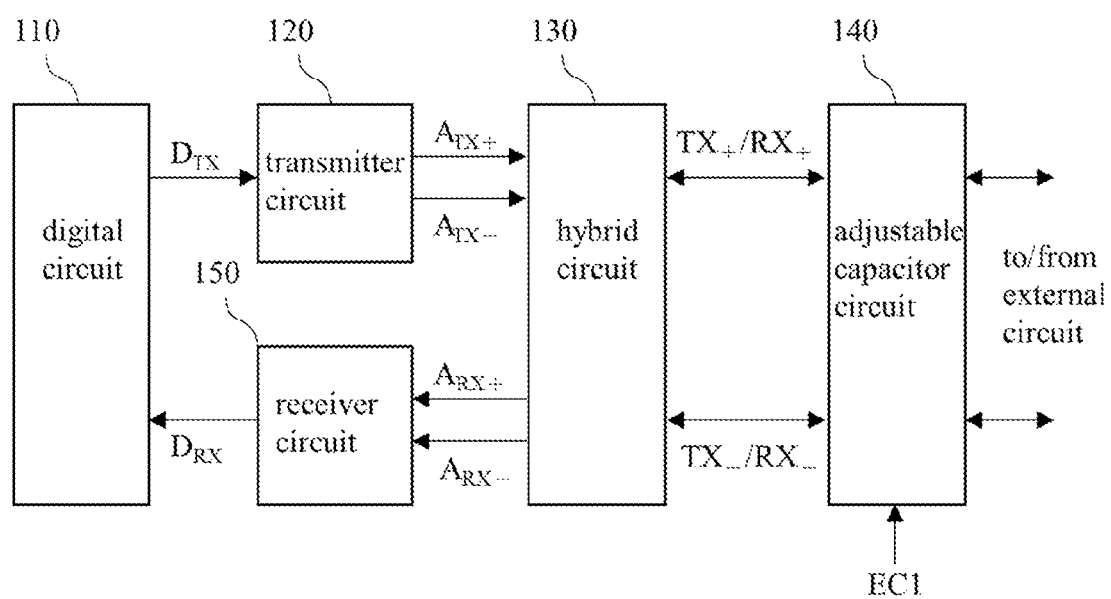
FIG. 1 shows an embodiment of the communication device of the present disclosure.

FIG. 1 shows an embodiment of the communication device of the present disclosure. The communication device 100 of FIG. 1 includes a digital circuit 110, a transmitter circuit 120, a hybrid circuit 130, an adjustable capacitor circuit 140, and a receiver circuit 150. The digital circuit 110 is configured to output a digital transmission signal $D_{TX}$ and to receive a digital reception signal $D_{RX}$. In this embodiment, both the digital transmission signal $D_{TX}$ and the digital reception signal $D_{RX}$ are single-ended signals. The transmitter circuit 120 is configured to output an analog transmission differential signal $A_{TX}$ including a positive-end signal $A_{TX+}$ and negative-end signal $A_{TX-}$ according to the digital transmission signal $D_{TX}$. The hybrid circuit 130 is coupled to the transmitter circuit 120 and receiver circuit 150, configured to output a transmission signal TX to an external circuit via the adjustable capacitor circuit 140 in accordance with the analog transmission differential signal $A_{TX}$, and configured to output an analog reception differential signal $A_{RX}$ to the receiver circuit 150 according to at least one of the analog transmission differential signal $A_{TX}$ and a reception signal RX, in which the transmission signal TX includes a positive-end signal $TX_+$ and a negative-end signal $TX_-$, the reception signal RX includes a positive-end signal $RX_+$ and a negative-end signal $RX_-$, at least a part of the reception signal RX is from the external circuit, and the analog reception differential signal $A_{RX}$ includes a positive-end signal $A_{RX+}$ and a negative-end signal $A_{RX-}$. The adjustable capacitor circuit 140 is configured to control the delay difference between the positive-end signal $TX_+$ and negative-end signal $TX_-$ of the transmission signal TX according to a first echo cancellation control signal EC1, thereby reduce the intra-pair skew caused by the difference between the transmission paths of the positive-end signal $TX_+$ and negative-end signal $TX_-$, and consequently reduce echo. In addition, since the paths between the hybrid circuit 130 and the external circuit function as the paths for transmission and reception, the first echo cancellation control signal EC1 also affects the delay difference between the positive-end signal $RX_+$ and negative-end signal $RX_-$ of the reception signal RX. The reception circuit 150 is configured to output the digital reception signal $D_{RX}$ to the digital circuit 110 according to the analog reception differential signal $A_{RX}$. Each of the above-mentioned digital circuit 110, transmitter circuit 120, and receiver circuit 150 is a known or self-developed circuit.

Figure 2:
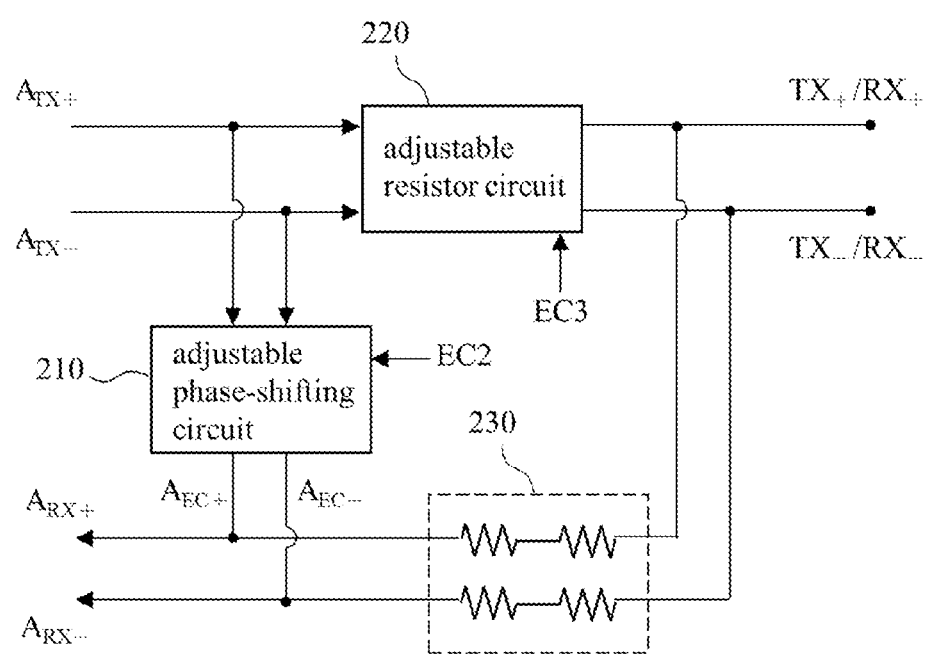
FIG. 2 shows an embodiment of the hybrid circuit of FIG. 1.

FIG. 2 shows an embodiment of the hybrid circuit 130 of FIG. 1 including an adjustable phase-shifting circuit 210, an adjustable resistor circuit 220, and a receiving-end resistor circuit 230. The adjustable phase-shifting circuit 210 and adjustable resistor circuit 220 are described in a later paragraph. The receiving-end resistor circuit 230 is a known or self-developed circuit, and the resistance thereof can be decided in accordance with the demand for implementation.

Referring to FIG. 2, the adjustable phase-shifting circuit 210 is configured to output an echo cancellation differential signal $A_{EC}$ to the receiver circuit 150 according to the analog transmission differential signal $A_{TX}$ and a second echo cancellation control signal EC2. The echo cancellation differential signal $A_{EC}$ includes a positive-end signal $A_{EC+}$ and a negative-end signal $A_{EC-}$. In an embodiment, the positive-end signal $A_{EC+}$ and negative-end signal $A_{EC-}$ are incorporated in the negative-end signal $A_{RX-}$ and positive-end signal $A_{RX+}$ of the analog reception differential signal $A_{RX}$ respectively. In another embodiment, the positive-end signal $A_{EC+}$ and negative-end signal $A_{EC-}$ are incorporated in the positive-end signal $A_{RX+}$ and negative-end signal $A_{RX-}$ of the analog reception differential signal $A_{RX}$ respectively.

Figure 3:
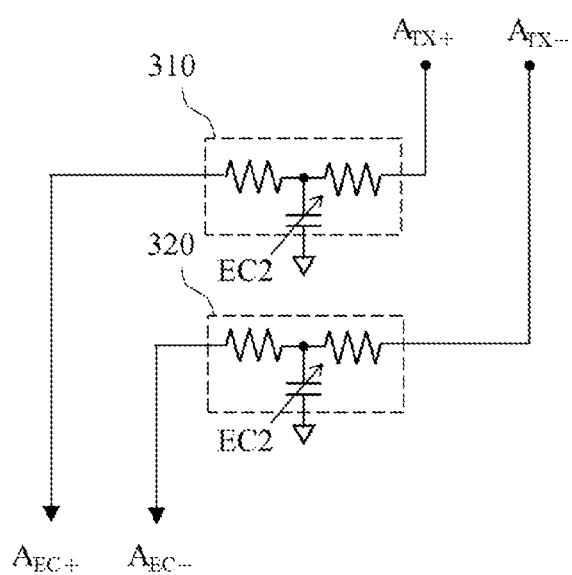
FIG. 3 shows an embodiment of the adjustable phase-shifting circuit of FIG. 2.

FIG. 3 shows an embodiment of the adjustable phase-shifting circuit 210 including a positive-end resistor and capacitor circuit (positive-end RC circuit) 310 and a negative-end resistor and capacitor circuit (negative-end RC circuit) 320. In FIG. 3, the symbol "∇" denotes a terminal of a predetermined voltage. The positive-end RC circuit 310 and the negative-end RC circuit 320 are configured to respectively control the transmission delays of the positive-end signal $A_{EC+}$ and negative-end signal $A_{EC-}$ of the echo cancellation differential signal $A_{EC}$ according to the second echo cancellation control signal EC2, in which the second echo cancellation control signal EC2 can optionally include a plurality of subsidiary signals for controlling the positive-end RC circuit 310 and negative-end RC circuit 320 respectively. In an exemplary implementation, the digital circuit 110 generates the second echo cancellation control signal EC2 according to the digital reception signal $D_{RX}$. In an exemplary implementation, the digital circuit 110 decides the coefficients of multiple taps of a digital echo cancellation filter (e.g., a known or self-developed linear/non-linear digital filter included in or independent of the digital circuit 110, and used for performing echo cancellation in a digital domain) according to the digital reception signal $D_{RX}$, and generates the second echo cancellation control signal EC2 according to at least a part of the coefficients (e.g., according to the sum of one or more coefficients, which jointly contribute the maximum/main filtering effect, among all the coefficients). The digital circuit 110 can optionally adjust the second echo cancellation control signal EC2 for adjusting the capacitance of the positive-end RC circuit 310 and negative-end RC circuit 320 and thereby obtain the sum of the above-mentioned at least a part of the coefficients under each of capacitance setting, and the minimum one of all the obtained sums stands for the minimum echo determined by the adjustable phase-shifting circuit 210.

Figure 4:
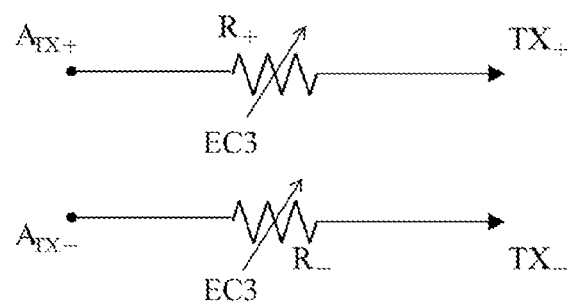
FIG. 4 shows an embodiment of the adjustable resistor circuit of FIG. 2

Referring to FIG. 2, the adjustable resistor circuit 220 is coupled between the transmitter circuit 120 and the adjustable capacitor circuit 140, and configured to control the impedance match setting between the communication device 100 and the external circuit according to a third echo cancellation control signal EC3. FIG. 4 shows an embodiment of the adjustable resistor circuit 220 of FIG. 2 including a positive-end resistor $R_+$ and a negative-end resistor $R_-$. The positive-end resistor $R_+$ and negative-end resistor $R_-$ are respectively configured to control the impedance matching setting of the transmission path of the positive-end signal $TX_+$ and the impedance matching setting of the transmission path of the negative-end signal $TX_-$ according to the third echo cancellation control signal EC3, in which the third echo cancellation control signal EC3 can optionally include a plurality of subsidiary signals for controlling the positive-end resistor $R_+$ and negative-end resistor $R_-$ respectively. In an exemplary implementation, the digital circuit 110 generates the third echo cancellation control signal EC3 according to the digital reception signal $D_{RX}$. In an exemplary implementation, the digital circuit 110 decides the coefficients of multiple taps of a digital echo cancellation filter according to the digital reception signal $D_{RX}$, and generates the third echo cancellation control signal EC3 according to at least a part of the coefficients (e.g., according to the sum of one or more coefficients, which jointly contribute the maximum/main filtering effect, among all the coefficients). The digital circuit 110 can optionally adjust the third echo cancellation control signal EC3 to adjust the resistance of the positive-end resistor $R_+$ and negative-end resistor $R_-$ and thereby obtain the sum of the above-mentioned at least a part of the coefficients under each of resistance setting, and the minimum one of all the obtained sums stands for the minimum echo determined by the adjustable resistor circuit 220.

Figure 5:
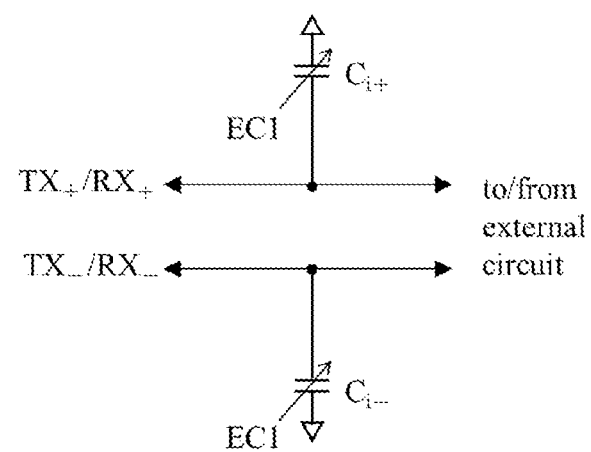
FIG. 5 shows an embodiment of the adjustable capacitor circuit of FIG. 1.

FIG. 5 shows an embodiment of the adjustable capacitor circuit 140 including a positive-end capacitor $C_{i+}$ and a negative-end capacitor $C_{i-}$. The positive-end capacitor $C_{i+}$ and negative-end capacitor $C_{i-}$ are respectively configured to control the delay amount of the positive-end signal $TX_+$ and the delay amount of the negative-end signal $TX_-$ according to the aforementioned first echo cancellation control signal EC1 which can optionally include a plurality of subsidiary signals for controlling the positive-end capacitor $C_{i+}$ and negative-end capacitor $C_{i+}$ respectively. In an exemplary implementation, the digital circuit 110 generates the first echo cancellation control signal EC1 according to the digital reception signal $D_{RX}$. In an exemplary implementation, the digital circuit 110 adjusts the positive-end capacitor $C_{i+}$ for N time(s) and the negative-end capacitor $C_{i-}$ for M time(s) according to the first echo cancellation control signal EC1 so as to obtain one echo cancellation result in the circumstance before capacitor adjustment and (N+M) echo cancellation results in the circumstance after capacitor adjustment by means of the digital reception signal $D_{RX}$. The above-mentioned capacitor adjustment can optionally be made in a predetermined order/rule; afterwards, the digital circuit 110 selects a result (e.g., the result having the optimal echo cancellation effect) among the (1+N+M) echo cancellation results and then outputs the first echo cancellation control signal EC1 in response to the selected result to determine the setting of the positive-end capacitor $C_{i+}$ and negative-end capacitor $C_{i-}$. One of the mentioned N and M is a positive integer and the other one is a non-negative integer, which implies that one of the positive-end capacitor $C_{i+}$ and negative-end capacitor $C_{i-}$ is adjusted for at least one time, and the other one is not adjusted or adjusted for at least one time.

Referring to FIG. 5, in an exemplary implementation, the digital circuit 110 decides the coefficients of multiple taps of a digital echo cancellation filter according to the digital reception signal $D_{RX}$, and generates the first echo cancellation control signal EC1 according to at least a part of the coefficients (e.g., according to the sum of one or more coefficients, which jointly contribute the maximum/main filtering effect, among all the coefficients). The digital circuit 110 can optionally adjust the first echo cancellation control signal EC1 and thereby adjust the capacitance of the positive-end capacitor $C_{i+}$ and negative-end capacitor $C_{i-}$ to obtain the sum of the above-mentioned at least a part of the coefficients under each of capacitance setting, and the minimum one of all the obtained sums stands for the minimum echo determined by the adjustable capacitor circuit 140. In another exemplary implementation, the digital circuit 110 calculates a signal-to-noise ratio according to the digital reception signal $D_{RX}$, and generates the first echo cancellation control signal EC1 according to the signal-to-noise ratio, in which the digital circuit 110 can optionally adjust the capacitance of the positive-end capacitor $C_{i+}$ and negative-end capacitor $C_{i-}$ according to the first echo cancellation control signal EC1 and thereby calculate the signal-to-noise ratio under each of capacitance setting, and the minimum one of all the obtained signal-to-noise ratios stands for the minimum echo determined by the adjustable capacitor circuit 140. This result is the consequence of less intra-pair skew induced by the aforementioned difference between the transmission paths and lesser electromagnetic interference noise induced by the lesser intra-pair skew.

Referring to FIG. 5, in an exemplary implementation, the adjustable capacitor circuit 140 merely includes one of the positive-end capacitor $C_{i+}$ and negative-end capacitor $C_{i-}$. In an exemplary implementation, the positive-end capacitor $C_{i+}$ and negative-end capacitor $C_{i-}$ can be adjusted by different ranges and/or steps respectively. In an exemplary implementation, the relation between the capacitance of the adjustable capacitor circuit 140 and the capacitance of the adjustable phase-shifting circuit 210 is determined according to predetermined setting. For instance, the difference between the middle capacitance value of the adjustable capacitor circuit 140 (e.g., the average of the maximum capacitance value and the minimum capacitance value, or the value among all selectable capacitance values of the adjustable capacitor circuit 140 which is the most close to the average) and the middle capacitance value of the adjustable phase-shifting circuit 210 is less than a predetermined threshold so that the flexibility of the communication device 100 in echo cancellation adjustment is ensured. In an exemplary implementation, the digital circuit 110 determines which of the energy of the external circuit's signal and the energy of the echo is greater according to the difference between the reception signal RX and the echo cancellation differential signal $A_{EC}$, and thereby adjusts at least one of the adjustable capacitor circuit 140, the adjustable phase-shifting circuit 210, and the adjustable resistor circuit 220 based on the energy of the external circuit's signal and/or the energy of the echo.

On the basis of the above description, an exemplary implementation of the transmitter circuit 120 of FIG. 1 includes known or self-developed circuits as follows: a digital-to-analog converter; and a line driver. An exemplary implementation of the receiver circuit 150 includes known or self-developed circuits as follows: a programmable gain amplifier; and an analog-to-digital converter. An exemplary implementation of the external circuit includes known or self-developed circuits as follows: a circuit-side medium dependent interface (MDI) trace; a transformer; a connector-side MDI trace; and a connector (e.g., RJ45 connector). In an exemplary implementation, the communication device 100 and the external circuit are used for power over Ethernet (PoE); regarding a PoE application, the difference between the actual impedance (e.g., 65 ohm) of the connector-side MDI trace of the external circuit and the optimal impedance (e.g., 100 ohm) specified by a standard is greater than 15% of the optimal impedance, and this impedance difference usually leads to more echo. Therefore, the echo cancellation capability of the communication device 100 is necessary. In an exemplary implementation, the communication device 100 of FIG. 1 is an integrated circuit, the aforementioned external circuit is not included in the integrated circuit, and both the communication device 100 and the external circuit are disposed on the same circuit board.

Figure 6:
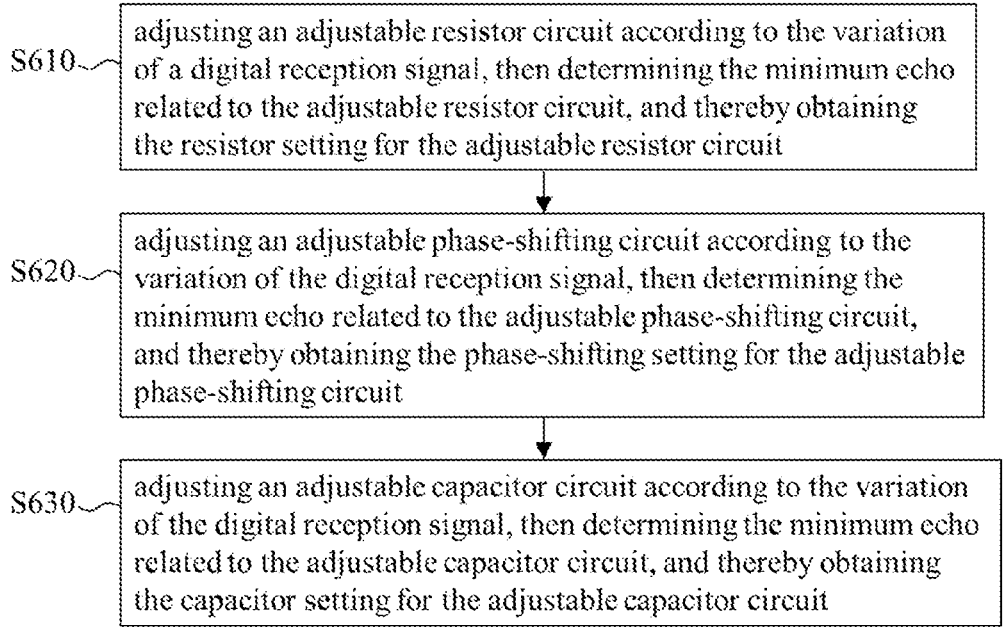
FIG. 6 shows the steps performed by the communication device of FIG. 1 in an exemplary implementation.

Referring to FIGS. 1-2, in an exemplary implementation the communication device 100 executes at least one of the following steps (as shown in FIG. 6) for echo cancellation:

step S610: adjusting the adjustable resistor circuit 220 of FIG. 2 according to the variation of the digital reception signal $D_{RX}$, then determining the minimum echo through the adjustment in the adjustable resistor circuit 220, and thereby obtaining the resistor setting of the adjustable resistor circuit 220 according to the minimum echo. The communication device 100 can optionally execute step S610 in a circumstance that the setting of the adjustable phase-shifting circuit 210 and the adjustable capacitor circuit 140 remains unchanged.

step S620: adjusting the adjustable phase-shifting circuit 210 of FIG. 2 according to the variation of the digital reception signal $D_{RX}$, then determining the minimum echo through the adjustment in the adjustable phase-shifting circuit 210, and thereby obtaining the phase-shifting setting of the adjustable phase-shifting circuit 210 according to the minimum echo. The communication device 100 can optionally execute step S620 in a circumstance that the setting of the adjustable resistor circuit 220 and the adjustable capacitor circuit 140 remains unchanged.

step S630: adjusting the adjustable capacitor circuit 140 of FIG. 1 according to the variation of the digital reception signal $D_{RX}$, then determining the minimum echo through the adjustment in the adjustable capacitor circuit 140, and thereby obtaining the capacitor setting of the adjustable capacitor circuit 140 according to the minimum echo. The communication device 100 can optionally execute step S630 in a circumstance that the setting of the adjustable resistor circuit 220 and the adjustable phase-shifting circuit 210 remains unchanged.

Referring to FIG. 6, in an exemplary implementation, the communication device 100 can execute the steps S610-S630 in turn. However, these steps can be carried out in a free order as long as it is practicable.

Since those of ordinary skill in the art can refer to the disclosure of the embodiments of FIGS. 1-5 to appreciate the detail and modification of the embodiment of FIG. 6, repeated and redundant description is omitted here.

It should be noted that people of ordinary skill in the art can implement the present disclosure by selectively using some or all of the features of any embodiment in this specification or by selectively using some or all of the features of multiple embodiments in this specification as long as such implementation is practicable, which implies that the present disclosure can be carried out flexibly.

To sum up, the communication device of the present disclosure can eliminate or reduce intra-pair skew and thereby improve the effect of echo cancellation.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A communication device capable of echo cancellation, comprising:
   a digital circuit configured to transmit a digital transmission signal and receive a digital reception signal;
   a transmitter circuit configured to output an analog transmission differential signal according to the digital transmission signal;
   a hybrid circuit coupled to the transmitter circuit and a receiver circuit, and configured to output a transmission signal to an external circuit via an adjustable capacitor circuit according to the analog transmission differential signal and output an analog reception differential signal to the receiver circuit according to at least one of the analog transmission differential signal and a reception signal, wherein at least a part of the reception signal is from the external circuit;
   the adjustable capacitor circuit configured to control a delay difference between a positive-end signal and a negative-end signal of the transmission signal according to a first echo cancellation control signal; and
   the receiver circuit configured to output the digital reception signal to the digital circuit according to the analog reception differential signal,
   wherein the hybrid circuit includes an adjustable phase-shifting circuit configured to output an echo cancellation differential signal to the receiver circuit according to the analog transmission differential signal and a second echo cancellation control signal, and the echo cancellation differential signal is incorporated in the analog reception differential signal.

2. The communication device of claim 1, wherein a difference between a capacitance middle value of the adjustable phase-shifting circuit and a capacitance middle value of the adjustable capacitor circuit is less than a predetermined threshold.

3. The communication device of claim 1, wherein the adjustable phase-shifting circuit includes two capacitors that are used to control a delay difference between a positive-end signal and a negative-end signal of the echo cancellation differential signal.

4. The communication device of claim 1, wherein the digital circuit generates the second echo cancellation control signal according to the digital reception signal.

5. The communication device of claim 4, wherein the digital circuit determines a plurality of coefficients of a digital echo cancellation filter according to the digital reception signal and generates the second echo cancellation control signal according to at least a part of the plurality of coefficients.

6. The communication device of claim 1, wherein the digital circuit generates the first echo cancellation control signal according to the digital reception signal.

7. The communication device of claim 6, wherein the digital circuit adjusts the adjustable capacitor circuit for X time(s) with the first echo cancellation control signal and thereby obtains (1+X) echo cancellation results, then the digital circuit outputs the first echo cancellation control signal according to the (1+X) echo cancellation results to set the adjustable capacitor circuit, and the X is a positive integer.

8. The communication device of claim 6, wherein the digital circuit determines a plurality of coefficients of a digital echo cancellation filter according to the digital reception signal and generates the first echo cancellation control signal according to at least a part of the plurality of coefficients.

9. The communication device of claim 6, wherein the digital circuit calculates a signal-to-noise ratio according to the digital reception signal and generates the first echo cancellation control signal according to the signal-to-noise ratio.

10. The communication device of claim 9, wherein the communication device is an Ethernet network device.

11. The communication device of claim 1, wherein the communication device is a wired network device.

12. A communication device capable of echo cancellation, comprising:
   a digital circuit configured to transmit a digital transmission signal and receive a digital reception signal;
   a transmitter circuit configured to output an analog transmission differential signal according to the digital transmission signal;
   a hybrid circuit coupled to the transmitter circuit and a receiver circuit, and configured to output a transmission signal to an external circuit via an adjustable capacitor circuit according to the analog transmission differential signal and output an analog reception differential signal to the receiver circuit according to at least one of the analog transmission differential signal and a reception signal, wherein at least a part of the reception signal is from the external circuit;
   the adjustable capacitor circuit configured to control a delay difference between a positive-end signal and a negative-end signal of the transmission signal according to a first echo cancellation control signal; and
   the receiver circuit configured to output the digital reception signal to the digital circuit according to the analog reception differential signal,
   wherein the hybrid circuit includes an adjustable resistor circuit, and the adjustable resistor circuit is coupled between the transmitter circuit and the adjustable capacitor circuit and configured to control impedance match setting between the communication device and the external circuit according to a third echo cancellation control signal.

13. The communication device of claim 12, wherein the digital circuit generates the third echo cancellation control signal according to the digital reception signal.

14. The communication device of claim 13, wherein the digital circuit determines a plurality of coefficients of a digital echo cancellation filter according to the digital reception signal and generates the third echo cancellation control signal according to at least a part of the plurality of coefficients.

15. A communication device capable of echo cancellation, comprising:
   a digital circuit configured to transmit a digital transmission signal and receive a digital reception signal;
   a transmitter circuit configured to output an analog transmission differential signal according to the digital transmission signal;
   a hybrid circuit coupled to the transmitter circuit and a receiver circuit, and configured to output a transmission signal to an external circuit via an adjustable capacitor circuit according to the analog transmission differential signal and output an analog reception differential signal to the receiver circuit according to at least one of the analog transmission differential signal and a reception signal, wherein at least a part of the reception signal is from the external circuit;

the adjustable capacitor circuit configured to control a delay difference between a positive-end signal and a negative-end signal of the transmission signal according to a first echo cancellation control signal; and the receiver circuit configured to output the digital reception signal to the digital circuit according to the analog reception differential signal, wherein the adjustable capacitor circuit includes:

a positive-end capacitor configured to control delay amount of the positive-end signal of the transmission signal according to the first echo cancellation control signal; and a negative-end capacitor configured to control delay amount of the negative-end signal of the transmission signal according to the first echo cancellation control signal.

16. The communication device of claim 15, wherein the digital circuit generates the first echo cancellation control signal according to the digital reception signal.

17. The communication device of claim 16, wherein the digital circuit determines a plurality of coefficients of a digital echo cancellation filter according to the digital reception signal and generates the first echo cancellation control signal according to at least a part of the plurality of coefficients.

18. The communication device of claim 16, wherein the digital circuit calculates a signal-to-noise ratio according to the digital reception signal and generates the first echo cancellation control signal according to the signal-to-noise ratio.

19. The communication device of claim 15, wherein the digital circuit generates the first echo cancellation control signal according to the digital reception signal and thereby adjusts the positive-end capacitor for N time(s) and the negative-end capacitor for M time(s) with the first echo cancellation control signal so as to obtain (1+N+M) echo cancellation results with the digital reception signal, then the digital circuit outputs the first echo cancellation control signal according to the (1+N+M) echo cancellation results to determine setting of the positive-end capacitor and the negative-end capacitor, and one of the N and the M is a positive integer while the other one of the N and the M is a non-negative integer.

* * * * *